United States Patent [19]

Hecht et al.

[11] Patent Number: 4,777,820

[45] Date of Patent: Oct. 18, 1988

[54] APPARATUS FOR DETERMINING THE FLOW RATE OF A FLOWING MEDIUM

[75] Inventors: Hans Hecht, Munchingen; Wolfgang Kienzle, Hemmingen; Josef Kleinhans, Ludwigsburg; Ulrich Kuhn, Renningen; Berthold Wocher, Leonberg, all of Fed. Rep. of Germany

[73] Assignee: Robert Bosch GmbH, Stuttgart, Fed. Rep. of Germany

[21] Appl. No.: 107,446

[22] Filed: Oct. 13, 1987

[30] Foreign Application Priority Data

Nov. 8, 1986 [DE] Fed. Rep. of Germany ....... 3638138

[51] Int. Cl.$^4$ .............................................. G01F 1/68
[52] U.S. Cl. .................................. 73/204.26; 73/118.2
[58] Field of Search ................ 73/204, 118.2; 338/292

[56] References Cited

U.S. PATENT DOCUMENTS 3,995,249  11/1976  Ferry ................................... 338/292
4,399,697  8/1983   Kohama et al. ...................... 73/204
4,498,337  2/1985   Gruner ................................ 73/204
4,594,889  6/1986   McCarthy ............................ 73/204

Primary Examiner—Jerry W. Myracle
Attorney, Agent, or Firm—Edwin E. Greigg

[57] ABSTRACT

An apparatus for determining the flow rate of a flowing medium having a substrate as a carrier and a resistor arrangement disposed on the substrate which among other elements includes a layer-like measuring resistor ($R_H$) as well as a likewise layer-like heating resistor ($R_S$), the heating output of which is regulated such that the measuring resistor ($R_H$) has a constant temperature, the heating output of the heating resistor ($R_S$) being a standard for the flow rate of the flowing medium. The surface area of ($R_S$) is greater than the surface area of ($R_H$) and extends farther toward a fastening of the substrate, in order to prevent a flow of heat out of the vicinity of the measuring resistor ($R_H$). The measuring resistor ($R_H$) and the heating resistor ($R_S$) are located on the downstream portion of the substrate, on a lip set off by a slit. With this disposition of the measuring resistor ($R_H$), soiling of the substrate affects the measurement result only slightly.

25 Claims, 4 Drawing Sheets

APPARATUS FOR DETERMINING THE FLOW RATE OF A FLOWING MEDIUM

RELATED PATENT APPLICATION

This application is co-pending with application filed Oct. 13, 1987 assigned Ser. No. 107,149, and assigned to Robert Rosch GmbH of Stuttgart, Federal Republic of Germany, further identified by R. 20895.

BACKGROUND OF THE INVENTION

The invention is based on an apparatus for determining the flow rate, or mass, of a flowing medium as defined hereinafter. From U.S. Pat. No. 4,399,697, an apparatus is known that has two resistors embodied as films on a substrate; the first film acts as a heating resistor and is secured directly on the substrate and the second film is embodied as a temperature-dependent measuring resistor and rests on the first film, with an electrically insulating film located between them. The insulating film separating the heating resistor and the measuring resistor is so thin that good heat transmission from the heating resistor to the measuring resistor is possible. Variations in the flow rate lead to a variation in the transmission of heat at the surface of the measuring resistor and the substrate and, since the measuring resistor is temperature-dependent, to a variation in the electrical resistance of the measuring resistor. The result is imbalancing of a measuring circuit, which is compensated for by varying the heating current at the heating resistor. Serving as the standard for the mass or flow rate of the flowing medium is the electrical power supplied to the heating resistor. An additional temperature-dependent resistor, which is disposed on an additional substrate, serves to balance the temperature of the medium.

A disadvantageous feature of this known apparatus is that not only the flow of heat convectively given up to the medium to be measured, but also the flow of heat that is transferred by thermal conduction from the substrate to the substrate holder, is detected. Since the substrate has a large thermal capacity in comparison with the resistors, unwanted heat transmission of this kind slows the starting up process that lasts until the required operating temperature of the measuring apparatus is reached and also makes for a slow response to changes in the flow rate of the medium. Hence the geometrical arrangement of the measuring resistor in the known apparatus cannot be considered optimal, because lateral outflows of heat from the substrate have a deleterious effect on the accuracy of the measurement result. The measuring resistor therefore has a low speed of response to changes in the flow rate.

The known apparatus also has the disadvantage of a strong tendency to becoming soiled, since especially when it is used in the intake tube of an internal combustion engine, particles of dirt from the intake tube atmosphere become deposited on the leading edge of the measuring resistor and over long-term operation negatively affect the measurement result.

OBJECT AND SUMMARY OF THE INVENTION

It is an object of the invention to devise an apparatus that has a simple mechanical and electronic design for determining the flow rate of a flowing medium, a short startup time, a short response time to changes in flow rate, and high accuracy in measurement even after long-term operation.

The apparatus according to the invention has the advantage of a short response time to changes in the flow rate, since the size and location of the heating resistor relative to the measuring resistor are dimensioned such that an outflow of heat from the substrate to the fastening of the substrate has no influence on the result of measurement, and the measuring resistor has virtually the same temperature profile over its entire surface area no matter what the flow rate.

Herein is also disclosed further advantageous developments of and improvements to an apparatus which is considered to be new and inventive. A particularly advantageous feature is thermally insulating slits cut into the substrate for preventing an objectionable flow of heat from and to the resistors.

It is also advantageous to secure the measuring resistor as far away from the leading edge of the substrate as possible, so as to keep the tendency toward soiling to a minimum in the vicinity of the measuring resistor.

Further resistors of the apparatus are advantageously accommodated on the same substrate and are likewise separated from one another by thermally insulating slits. Since the effects of soiling is not as serious for these resistors as for the measuring resistor, they can be placed upstream of the measuring resistor.

Fabrication of the Apparatus according to the invention is simplified substantially if the resistors are embodied as films and if the same films, with consequently the same resistance per square, are used for various resistors. The exact definition of the resistor characteristic of each resistor is then achieved by removal of resistor material, for example by laser cutting of meandering patterns in the resistor film.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
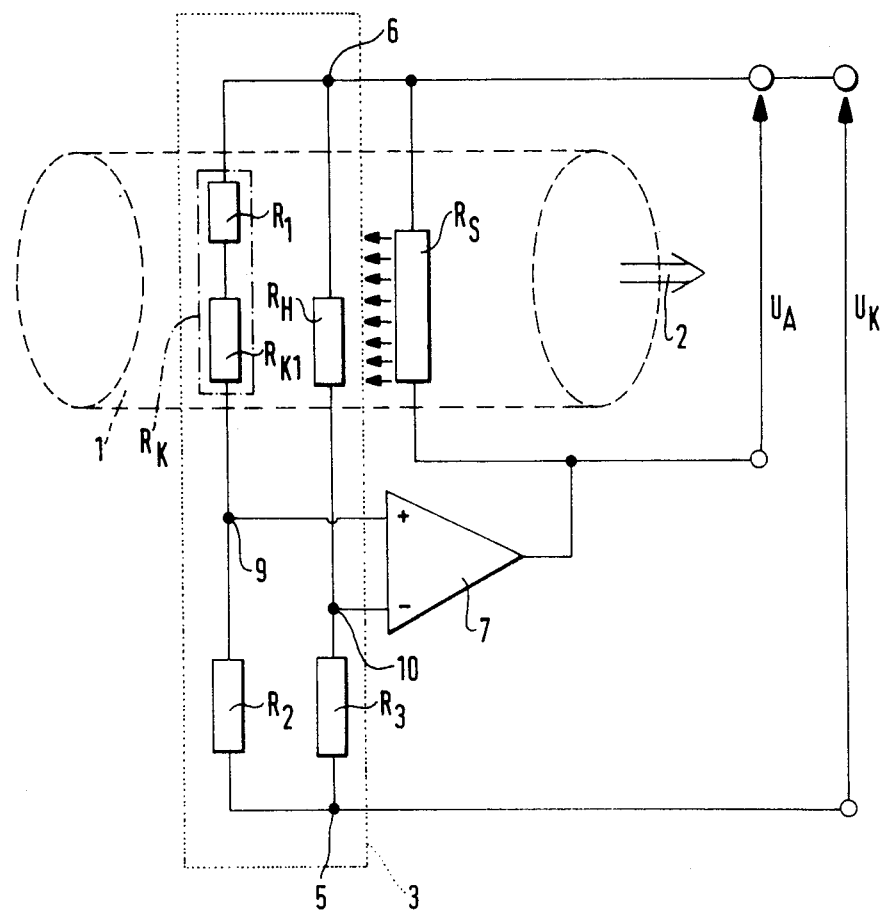
FIG. 1 is a circuit diagram of the invention.

In FIG. 1, reference numeral 1 indicates a tube through which a fluid flows; the direction of flow of the medium is represented by an arrow 2. The tube 1 may be, for example, the intake tube of an internal combustion engine. A resistor $R_H$, which serves to ascertain the flow rate through the tube 1 and will be referred to hereinafter as the measuring resistor, is introduced into the tube 1. This measuring resistor $R_H$ is embodied as a resistor or film resistor formed of different layers on a substrate, not shown in FIG. 1, and is a component of a resistance detection device 3, embodied for example as a bridge circuit. This resistance detection device 3 is completed with the resistors $R_1$, $R_{K1}$, $R_2$ and $R_3$ and is connected as a resistor measuring bridge. Beginning at a base point 5, the resistors are connected in series in each bridge branch as follows: $R_2$, $R_{K1}$ and $R_1$ in one branch, and $R_3$ and $R_H$ in the other. The connection leads of the resistors $R_1$ and $R_H$ are joined at a point 6. The signals of a point 9, as the connecting point of the resistors $R_{K1}$ and $R_2$, and of a point 10, as the connecting point of the resistors $R_H$ and $R_3$, are supplied to a regulating amplifier 7.

The regulating amplifier 7 is for example embodied as a differential amplifier, but the invention is not limited to such differential amplifiers but instead is applicable in general to any analog and digital regulating function.

The initial variable of the regulating amplifier 7 is supplied to a resistor $R_S$, the other connecting lead of which is connected to the point 6, so that the overall result is a closed loop.

It should be stressed that the resistance detection device 3 can be realized not only in the form of a bridge circuit but by means of any other resistance measuring circuits as well. To realize the invention, a bridge circuit is accordingly not absolutely necessary, and measuring circuits similar to bridges are also conceivable.

The basic operation of this device is as follows:

The initial current of the regulating amplifier 7 causes heating of the resistor $R_S$, henceforth called the heating resistor; the heating output at this resistor is substantially determined by the bridge diagonal voltage at the regulating amplifier 7. The heating resistor $R_S$ is embodied such that it is in the most direct possible thermal contact with the measuring resistor $R_H$. Because of the good thermal contact between $R_S$ and $R_H$, the measuring resistor $R_H$ is brought to an elevated temperature that is far above the temperature of the medium. If the mass flowing through the tube 1, or in other words the flow rate of the medium, now varies, then because of the changed convective heat transmission the temperature of the measuring resistor $R_H$ varies as well, and since the measuring resistor $R_H$ has a temperature coefficient not equal to zero, the resistance detection device 3 becomes unbalanced, causing the regulating amplifier 7 to vary the initial current that flows to the heating resistor $R_S$. That is, changes in the measuring resistor $R_H$ caused by an outflowing or inflowing amount of heat are always compensated for via a closed loop by a variation in the heating output of the heating resistor $R_S$, so that the measuring resistor $R_H$ is kept at a predetermined temperature or at a predetermined resistance value. The heating current, the heating output or the output voltage $U_A$ of the regulating amplifier 7 are a measure of the flow rate or mass of the flowing medium.

However, since the heating current, the heating output or the output voltage $U_A$ of the regulating amplifier 7 also depend on the temperature of the flowing medium, fluctuations in the temperature of the flowing medium must be compensated for. To this end, a compensating resistor $R_K$ is provided, which is likewise exposed to the flowing medium and is made up of the series-connected resistors $R_{K1}$ and $R_1$. While the resistor $R_{K1}$ is embodied as a film resistor and can be fabricated by the same technique and in the same operation as the measuring resistor $R_H$, the resistor $R_1$ is a resistor formed by different layers which is calibrated in such a manner—for instance, by meandering cuts—that the temperature coefficient of the compensating resistor $R_K$ and of the measuring resistor $R_H$ are at a predetermined ratio to one another, depending on the evaluation method used to ascertain the signal size.

The resistance detection device 3 is completed by a first reference resistor $R_2$, which is located between the base point 5 and point 9, and a second reference resistor $R_3$, which is located between the base point 5 and point 10. It is unnecesssary to expose the reference resistors $R_2$ and $R_3$ to the flowing medium, but $R_2$ and $R_3$ should be in the closest possible thermal contact with one another, which makes a close tolerance in the temperature coefficient of the resistors $R_2$ and $R_3$ unnecessary.

Figures 2, 3:
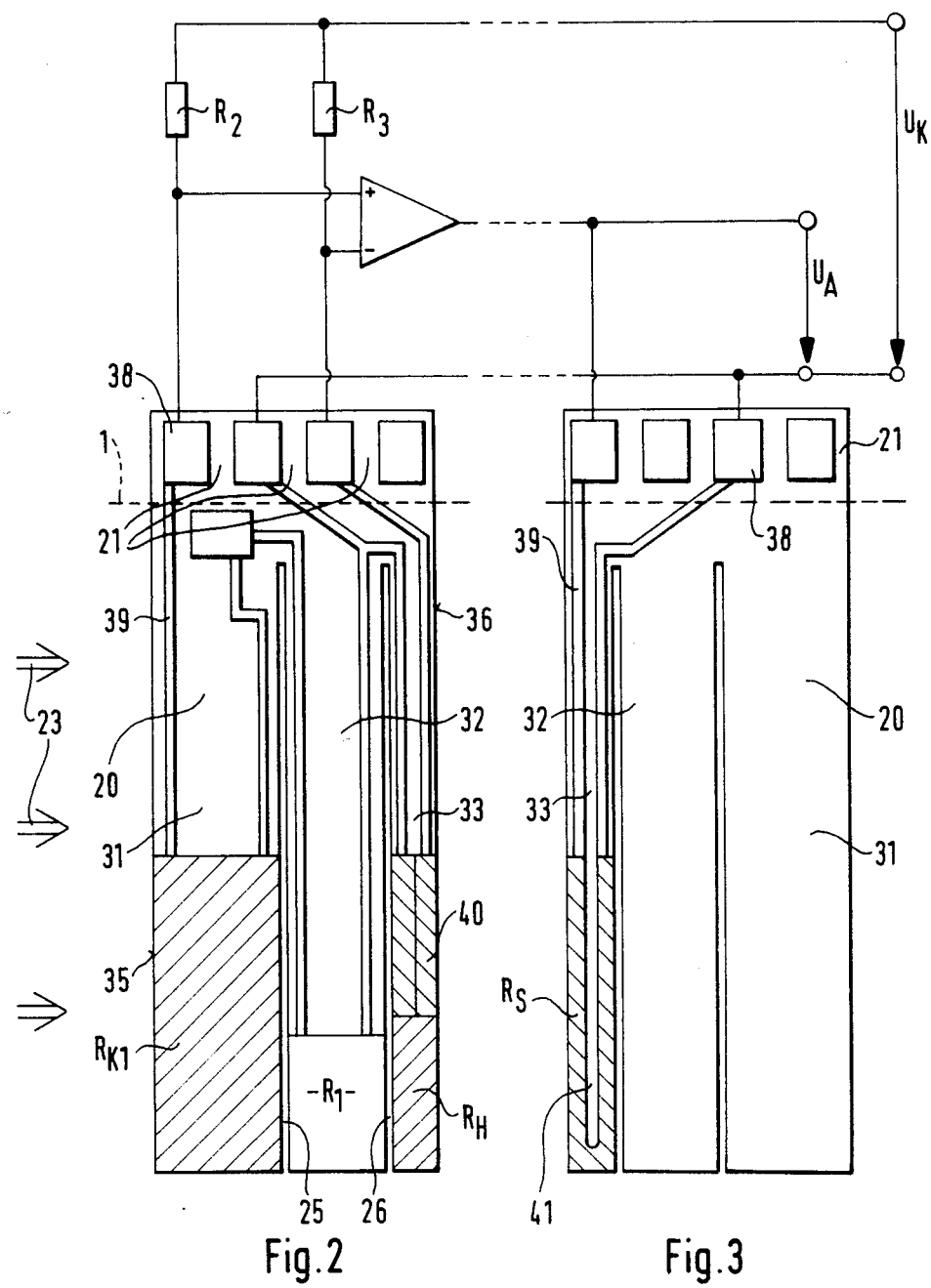
FIG. 2 is a view of the leading side of a first embodiment of an apparatus according to the invention for determining the flow rate of a flowing medium.
FIG. 3 is a view of the corresponding trailing edge.

FIGS. 2 and 3 show a first preferred embodiment of the invention having the heating resistor $R_S$, measuring resistor $R_H$, film resistor $R_{K1}$ and layered resistor $R_1$. All these resistors are disposed as thin films on a platform-like substrate serving as a carrier, which is approximately rectangular and is secured on one of its shorter sides, in the vicinity of a fastening 21, on the tube 1 through which the medium to be measured flows. At right angles to the medium flow direction indicated by arrows 23, two slits 25, 26 are cut into the substrate 20, beginning at the end of the substrate 20 remote from the fastening 21 and extending almost to the fastening 21. The slits 25, 26 divide the substrate 20 into a first lip 31, a second lip 32 and a third lip 33. The first lip 31 is defined on one side by the leading edge 35 of the substrate 20 oriented counter to the flow direction and on the other by the first slit 25; the second lip 32 of the substrate 20 is defined on one side by the first slit 25 and on the other by the second slit 26; and the third lip 33 of the substrate 20 is defined on one side by the second slit 26 and on the other by a trailing edge 36 of the substrate 20.

In the vicinity of the fastening 21, contact faces 38 are located on the substrate 20, which on one side are connected to the resistors $R_H$, $R_S$, $R_{K1}$ and $R_1$ via electrical conductor tracks 39 disposed on the substrate 20 and on the other are electrically connected to the resistors $R_2$, $R_3$, the regulating amplifier 7 and the zero conductor (point 6 in FIG. 1). The resistors $R_S$, $R_H$, $R_{K1}$ and $R_1$ each cover parts of the lips 31, 32, 33 remote from the fastening 21 and are advantageously so arranged that the film resistor $R_{K1}$ is disposed on the first lip 31, the layered resistor $R_1$ is disposed on the second lip 32 and the measuring resistor $R_H$ is disposed on the third lip 33. The heating resistor $R_S$ is located, in the exemplary embodiment of FIGS. 2 and 3, on the back side of the substrate 20 and covers the part of the third lip 33 remote from the fastening 21. The measuring resistor $R_H$ is thus disposed on one side and the heating resistor $R_S$ on the other side of the third lip 33 of the substrate 20, and $R_H$ and $R_S$ are in thermal contact via the substrate 20 located between them.

The geometrical size of the resistors in proportion to the size of the substrate 20 is dimensioned such that the film resistor $R_{K1}$ and the heating resistor $R_S$ cover approximately half of the substrate 20 that is remote from the fastening 21. The length of the slits 25 and 26 is dimensioned such that they extend farther in the direction of the fastening 21 than do each of the resistors $R_S$, $R_H$, $R_{K1}$ and $R_1$; by this means, very good thermal separation is attained among the individual lips 31, 32, 33 and hence among the individual resistors.

The fabrication of the apparatus is simplified substantially if those resistor films that form the film resistor $R_{K1}$ and the measuring resistor $R_H$ are made of the same material and extend approximately equally far toward the fastening 21. Since the film resistor $R_{K1}$ and the measuring resistor $R_H$ are made of the same material and hence have the same resistance per square, these resistor films are provided with meandering structures in order to produce the necessary individual resistors. This can be done by means of laser cuts, not shown in FIG. 2. As a material for the resistor films that embody $R_{K1}$ and $R_H$, platinum is for instance possible.

Between the film resistor $R_{K1}$ and the measuring resistor $R_H$, the layered resistor $R_1$ is applied on the second lip 32 of the substrate 20, for example by a thick-film process.

To prevent flows of heat out of the vicinity of the measuring resistor $R_H$ in the direction of the fastening 21, the heating resistor $R_S$ extends farther toward the fastening 21 than the measuring resistor $R_H$. This kind of definition of the effective surface area of the measuring resistor $R_H$ is attained in that by suitably making meandering patterns, only that part of the particular resistor layer which forms the measuring resistor $R_H$ that is remote from the fastening 21 is made electrically conductive, while the part of that resistor layer that is oriented toward the fastening 21 is left without any electrical function and forms nonelectrical layer 40. As a result of this geometrical arrangement of the effective area of the measuring resistor $R_H$, the heated zone of the substrate 20 defined by the expansion of the heating resistor $R_S$ protrudes farther toward the fastening 21 than the measuring resistor $R_H$, thereby preventing an unwanted outflow of heat out of the vicinity of the measuring resistor $R_H$ in the direction of the fastening 21, and the speed of response of the measuring resistor $R_H$ to flow rate changes is thereby increased, since when there are flow rate changes a new temperature profile need not be established each time for the measuring resistor $R_H$.

For calibration of its individual resistance, the layer-like resistor $R_S$ can also be provided with meandering patterns.

FIG. 3 shows the back of the apparatus according to the invention, with the heating resistor $R_S$ accomodated on the third lip 33. The heating resistor $R_S$ has a notch 41, for instance, opening in the direction toward the fastening 21, and thus has the shape of a stylized U. Also located on the back of the substrate 20 are contact faces 38, which are connected via conductor tracks 39 to the legs of the U-shaped heating resistor $R_S$. No electrical components are located in the vicinity of the first lip 31 and the second lip 32 on the back of the substrate 20.

Figure 4:
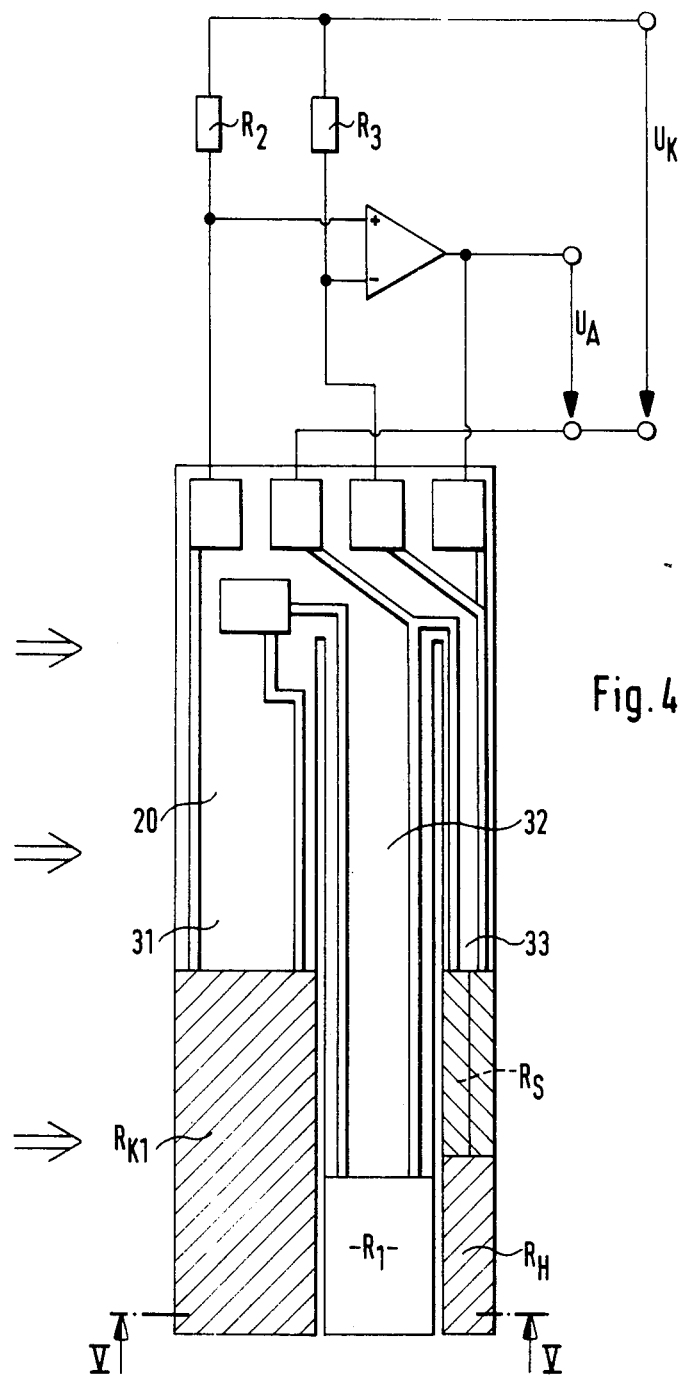
FIG. 4 shows a second exemplary embodiment of an apparatus according to the invention.
Figure 5:
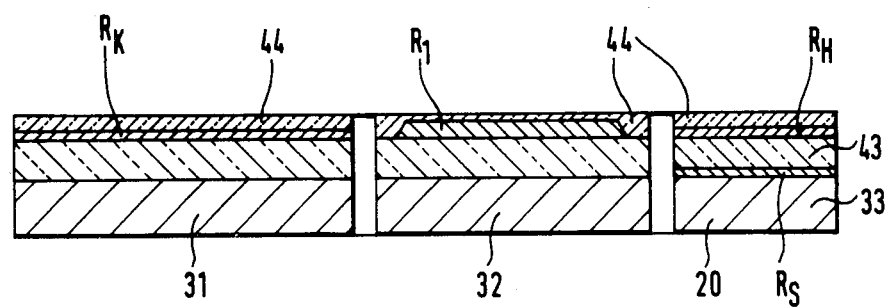
FIG. 5 is a section taken along the line V—V of FIG. 4.

A further exemplary embodiment of the invention is shown in FIG. 4 and again, in section, in FIG. 5. In this exemplary embodiment, the measuring resistor $R_H$ and the heating resistor $R_S$ are not located on different sides of the substrate 20 but instead are both located on the front of the substrate 20, as are the film resistor $R_{K1}$ and the layered resistor $R_1$. While the resistor layers in the vicinity of the first lip 31 and the second lip 32 are disposed in the same manner as in the first exemplary embodiment, on the surface of the substrate 20 in the vicinity of the third lip 33 the heating resistor $R_S$ and the measuring resistor $R_H$ are layered one on top of the other. The heating resistor $R_S$ is located directly on the substrate 20 acting as a carrier, and the measuring substrate 20 acting as a carrier, and the measuring resistor $R_H$ is located over it, with an interposed layer 43 that is electrically insulating but has good thermal conductivity located between them, for instance being a layer of glass. To compensate for the differences in the structural height of the individual electrical components, and for reasons having to do with manufacturing techniques, not only the third lip 33 of the substrate 20 but the other two lips 31 and 32 as well are coated with the layer 43, so that the layer 43 terminates within one plane on the side remote from the substrate 20. Besides the measuring resistor $R_H$, the layered resistor $R_1$ and the film resistor $R_{K1}$ are also located on the layer 43. For the sake of better protection against soiling and damage to the resistors, the substrate 20 and the resistors can be coated with an additional protective layer 44.

The the first exemplary embodiment of FIGS. 2 and 3 and the second exemplary embodiment of FIGS. 4 and 5 differ primarily in terms of the difference in electrical insulation between the measuring resistor $R_H$ and the heating resistor $R_S$. In the first exemplary embodiment, the substrate 20 itself acts as an insulating layer, while in the second exemplary embodiment, contrarily, it is the layer 43. Naturally, if the heating resistor $R_S$ and the measuring resistor $R_H$ are separated only by the layer 43, the conductor tracks 39 leading to these resistors must also be electrically insulated from one another, which can be accomplished by means of the same layer 43.

A common feature of both exemplary embodiments shown is the essential characteristic that the measuring resistor $R_H$ is located on the rear portion of the substrate 20, as viewed in the flow direction, and as a result deposits of dirt, which preferentially stick to the forward portion of such a device, have only a slight effect on the result of measurement. By means of the slits 25, 26, a flow of heat from or to the resistors is largely avoided, and the slits 25, 26 also serve as additional "dirt traps", because dirt particles can be deposited in them.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An apparatus for determining the flow rate of a flowing medium through a flow passage, having a substrate retained in the flow passage, fastening means for retaining said substrate in said flow passage, a layer-like, temperature-dependent measuring resistor included on an end of said substrate removed from said fastening means, a heating resistor included on said substrate, said heating resistor being regulatable via a resistor detection device as a function of a flow rate of the flowing medium, said heating resistor being formed as a layer and being superimposed in an electrically insulated manner by said measuring resistor, said heating resistor ($R_S$) includes a surface area which is larger than the surface area of the measuring resistor ($R_H$) and the heating resistor ($R_S$) extends farther toward the fastening (21) than the measuring resistor ($R_H$) extends.

2. An apparatus as defined by claim 1, which includes a slit (26) extending through said substrate at right angles to the flow direction, in which the measuring resistor ($R_H$) and heating resistor ($R_S$) are embodied on a part of the substrate (20) that extends downstream of said slit (26).

3. An apparatus as defined by claim 2, in which said substrate (20) is fastened in one end and that the slit (26) extends toward the fastening means (21), beginning at an edge of the substrate (20) remote from the fastening means.

4. An apparatus as defined by claim 3, in which said heating resistor ($R_S$) is defined upstream by said slit (26)

and downstream by a trailing edge (36) of said substrate (20).

5. An apparatus as defined by claim 4, which includes a compensating resistor ($R_K$) located on said substrate (20) upstream of the slit (26).

6. An apparatus as defined by claim 5, in which the substrate (20) is provided, upstream of the slit (26), with a further slit (25) extending parallel to the slit (26), and a temperature-dependent film resistor ($R_{K1}$) is applied to the substrate on one side of said further slit (25) and a layered resistor ($R_1$) is applied to the substrate on the other side of the further slit (25), and the film resistor ($R_{K1}$) and the layered resistor ($R_1$) together form the compensating resistor ($R_K$).

7. An apparatus as defined by claim 6, in which said film resistor ($R_{K1}$) ends flush with the slit (25) or with a leading edge (35) of the substrate (20).

8. An apparatus as defined by claim 7, in which said heating resistor ($R_S$) and said film resistor ($R_{K1}$) are located in a part of the substrate (20) remote from the fastening (21) and extend as far as an edge of the substrate (20) remote from the fastening (21).

9. An apparatus as defined by claim 8, in which said measuring resistor ($R_H$) also extends as far as an edge of the substrate (20) remote from the fastening (21).

10. An apparatus as defined by claim 9, in which said measuring resistor ($R_H$) and the film resistor ($R_{K1}$) have the same resistance per square and are embodied on the same flat side of the substrate (20).

11. An apparatus as defined by claim 9, in which said individual resistance of the resistors ($R_H$, $R_S$, $R_{K1}$, $R_1$) is defined by meandering cuts.

12. An apparatus as defined by claim 8, in which said measuring resistor ($R_H$) and the film resistor ($R_{K1}$) have the same resistance per square and are embodied on the same flat side of the substrate (20).

13. An apparatus as defined by claim 8, in which said individual resistance of the resistors ($R_H$, $R_S$, $R_{K1}$, $R_1$) is defined by meandering cuts.

14. An apparatus as defined by claim 7, in which said measuring resistor ($R_H$) and the film resistor ($R_{K1}$) have the same resistance per square and are embodied on the same flat side of the substrate (20).

15. An apparatus as defined by claim 7, in which said individual resistance of the resistors ($R_H$, $R_S$, $R_{K1}$, $R_1$) is defined by meandering cuts.

16. An apparatus as defined by claim 6, in which said measuring resistor ($R_H$) and the film resistor ($R_{K1}$) have the same resistance per square and are embodied on the same flat side of the substrate (20).

17. An apparatus as defined by claim 16, in which said measuring resistor ($R_H$) and said heating resistor ($R_S$) are each embodied on a different one of the flat sides of the substrate (20).

18. An apparatus as defined by claim 16, in which said measuring resistor ($R_H$) and the heating resistor ($R_S$) are embodied on the same flat side of the substrate (20) and the measuring resistor ($R_H$) is underlaid by the heating resistor ($R_S$).

19. An apparatus as defined by claim 6, in which said individual resistance of the resistors ($R_H$, $R_S$, $R_{K1}$, $R_1$) is defined by meandering cuts.

20. An apparatus as defined by claim 19, in which said measuring resistor ($R_H$) and said heating resistor ($R_S$) are each embodied on a different one of the flat sides of the substrate (20).

21. An apparatus as defined by claim 19, in which said measuring resistor ($R_H$) and the heating resistor ($R_S$) are embodied on the same flat side of the substrate (20) and the measuring resistor ($R_H$) is underlaid by the heating resistor ($R_S$).

22. An apparatus as defined by claim 1, in which said measuring resistor ($R_H$) and said heating resistor ($R_S$) are each embodied on a different one of the flat sides of the substrate (20).

23. An apparatus as defined by claim 22, in which at least the resistors ($R_H$, $R_{K1}$, $R_1$) are coated with a protective layer (44).

24. An apparatus as defined by claim 1, in which said measuring resistor ($R_H$) and the heating resistor ($R_S$) are embodied on the same flat side of the substrate (20) and the measuring resistor ($R_H$) is underlaid by the heating resistor ($R_S$).

25. An apparatus as defined by claim 24, in which at least the resistors ($R_H$, $R_{K1}$, $R_1$) are coated with a protective layer (44).

* * * * *